US012239225B2

(12) United States Patent
Harve (10) Patent No.: US 12,239,225 B2
(45) Date of Patent: Mar. 4, 2025

(54) MAGNETIC INVISIBLE SHELF SUPPORT

(71) Applicant: Shweta Harve, Parker, TX (US)

(72) Inventor: Shweta Harve, Parker, TX (US)

(73) Assignee: Shweta Harve, Parker, TX (US)

( * ) Notice: Subject to any disclaimer, the term of this patent is extended or adjusted under 35 U.S.C. 154(b) by 0 days.

(21) Appl. No.: 18/094,360

(22) Filed: Jan. 8, 2023

(65) Prior Publication Data

US 2024/0245214 A1     Jul. 25, 2024

Related U.S. Application Data

(60) Provisional application No. 63/297,762, filed on Jan. 9, 2022.

(51) Int. Cl.
| | |
|---|---|
| *A47B 96/06* | (2006.01) |
| *F16B 12/24* | (2006.01) |
| *G06F 3/03* | (2006.01) |
| *G06F 3/0354* | (2013.01) |
| *G06F 3/048* | (2013.01) |
| *G06F 3/04812* | (2022.01) |
| *H04W 4/80* | (2018.01) |

(52) U.S. Cl.
CPC ............ *A47B 96/066* (2013.01); *F16B 12/24* (2013.01); *G06F 3/03543* (2013.01); *G06F 3/03547* (2013.01); *G06F 3/04812* (2013.01); *H04W 4/80* (2018.02); *A47B 2230/07* (2013.01); *F16B 2200/83* (2023.08); *G06F 2203/0331* (2013.01)

(58) Field of Classification Search
CPC ... A47B 96/066; A47B 2230/07; F16B 12/24; F16B 2200/83; G06F 3/03543; G06F 3/04812
See application file for complete search history.

(56) References Cited

U.S. PATENT DOCUMENTS

| | | | | |
|---|---|---|---|---|
| 5,176,570 | A * | 1/1993 | Liedl | F24F 13/28 55/502 |
| 5,525,145 | A * | 6/1996 | Hodge | B01D 46/10 55/516 |
| 5,707,411 | A * | 1/1998 | Rodaway | B01D 39/1623 55/DIG. 35 |
| 5,720,660 | A * | 2/1998 | Benedetto | F24F 13/08 454/289 |
| 5,776,218 | A * | 7/1998 | Enns | B01D 46/0004 55/DIG. 35 |
| 6,030,427 | A * | 2/2000 | Sorice | B01D 46/10 55/DIG. 35 |

(Continued)

*Primary Examiner* — Bayan Salone (57) ABSTRACT

A system for binding horizontal and vertical panels is provided. The system comprises a casing comprising a barrel and a cover, the casing inserted into an end of a horizontal panel. The system also comprises a cylindrical metal insert embedded into a first surface of a vertical panel. The system also comprises a sliding metal pin inside the casing that receives attraction with a magnet placed on a second surface of the horizontal panel proximate the casing. The pin moves, based on the received attraction and after the end of the horizontal panel is placed against the vertical panel at a location of the insert, the movement of the pin based on movement of the magnet. The pin also protrudes partially, based on the movement through a first hole in the cover, into a second hole in the insert.

14 Claims, 7 Drawing Sheets

(56) References Cited

U.S. PATENT DOCUMENTS

| | | | | |
|---|---|---|---|---|
| 6,241,603 B1* | 6/2001 | Watson | ........ | F24F 13/085 |
| | | | | 454/307 |
| 6,241,794 B1* | 6/2001 | Jadran | ........ | B01D 46/10 |
| | | | | 55/DIG. 35 |
| 6,425,945 B1* | 7/2002 | Cheng | ........ | F24F 3/044 |
| | | | | 55/483 |
| 6,749,499 B1* | 6/2004 | Snyder | ........ | F24F 13/085 |
| | | | | 55/385.2 |
| 6,797,028 B2* | 9/2004 | Duffy | ........ | F24F 13/28 |
| | | | | 55/DIG. 35 |
| 6,814,660 B1* | 11/2004 | Cavett | ........ | B01D 46/10 |
| | | | | 454/284 |
| 7,128,643 B2* | 10/2006 | Beliveau | ........ | F24F 13/085 |
| | | | | 454/271 |
| 8,016,921 B2* | 9/2011 | Hassell | ........ | B01D 46/0002 |
| | | | | 55/497 |
| 9,113,705 B1* | 8/2015 | Jacob | ........ | F16H 19/04 |
| 10,578,140 B2* | 3/2020 | Porter | ........ | F16B 12/12 |
| 10,923,261 B2* | 2/2021 | Singla | ........ | H01F 7/02 |
| 11,767,868 B2* | 9/2023 | Klingler | ........ | F16B 5/121 |
| | | | | 248/206.5 |
| 2005/0266791 A1* | 12/2005 | Beliveau | ........ | E04B 1/7076 |
| | | | | 454/271 |
| 2012/0124951 A1* | 5/2012 | Miskel | ........ | B01D 46/2411 |
| | | | | 55/504 |
| 2016/0032954 A1* | 2/2016 | Porter | ........ | F16B 12/12 |
| | | | | 24/303 |

* cited by examiner

FIG. 15

MAGNETIC INVISIBLE SHELF SUPPORT

CROSS REFERENCE TO RELATED APPLICATIONS

The present non-provisional patent application is related to U.S. Provisional Patent Application No. 63/297,762 filed Jan. 9, 2022.

FIELD OF THE DISCLOSURE

The present disclosure is in the field of furniture construction and binding systems and methods for panels and other components. More particularly, the present disclosure provides systems and methods of using magnetic forces to cause hardware used in joining panels to move into position such that panels may be joined and furniture shelving joined with vertical furniture sidewalls in some applications.

BACKGROUND

Furniture manufacturers, furniture repair companies, custom closet and cabinet makers, and interior decorators seek to provide furniture to their customers which is sleek and clean in appearance as well as easy and intuitive to assemble and disassemble. Much furniture manufactured previously has exposed hardware, often metal components, that is both visually unattractive as well as potentially damaging to stored contents. In addition, such exposed metal hardware is difficult to assemble and disassemble which raises risks of damaging the furniture and causing personal injury if used improperly. Further, because user manuals for furniture are usually poorly written, vague, and translated from languages other than English, it is to the advantage of manufacturers to have assembly be as intuitive as possible. Furniture assembly can be frustrating and time consuming for buyers. It is to the advantage of manufacturers to make assembly as simple and streamlined as possible.

DETAILED DESCRIPTION

Systems and methods described herein provide a magnetic invisible shelf support device that when installed is concealed inside vertical and horizontal panels of the subject item of furniture or shelving. Systems and methods promote shelves to be affixed to vertical sidewalls of bookshelves, cabinets, cupboards, or similar items of furniture with the supporting hardware provided herein being completely concealed.

A magnetic casing is inserted inside an end panel of a shelf. A cylindrical insert with a hole in its center is firmly affixed into the vertical sidewall at the point where the shelf is to be joined.

The casing contains a horizontal sliding pin that is positioned immediately in front of the cylindrical insert such that the head of the pin is situated over the hole in the insert. When the bolt is magnetically caused to slide toward the insert, the pin emerges from the casing and protrudes deeply into the hole in the insert, securing the horizontal shelf to the vertical sidewall. A handheld magnet tool is used to horizontally move the pin forward and backward to its protruded or recessed position, respectively, to engage and disengage, respectively, with the insert.

The system, which may be referred to commercially as the INVISI-BOLSTER™, uses non-contact pass-through magnetic forces to lock and unlock the casing in the shelf and move the pin into and out of the insert in the sidewall or vertical panel. The handheld magnetic tool moves the pin that is within the casing. The casing itself is entirely inside the shelf except for its outermost surface that is flush with the surface of the end panel of the shelf that contacts the surface of the vertical sidewall and binds to it.

The user slides the magnetic tool along the surface of the shelf over the location of the casing. The magnetic forces of the tool contact the casing through the wood or particle board of the shelf and cause the pin in the casing to move in the direction in which the magnet is being moved and toward the hole in the insert. When disassembling the bookshelf or cabinet, the user slides the magnet in the opposite direction which causes the pin to withdraw from the hole in the insert, thus permitting the shelf and the vertical sidewall to no longer be joined.

Figure 1:
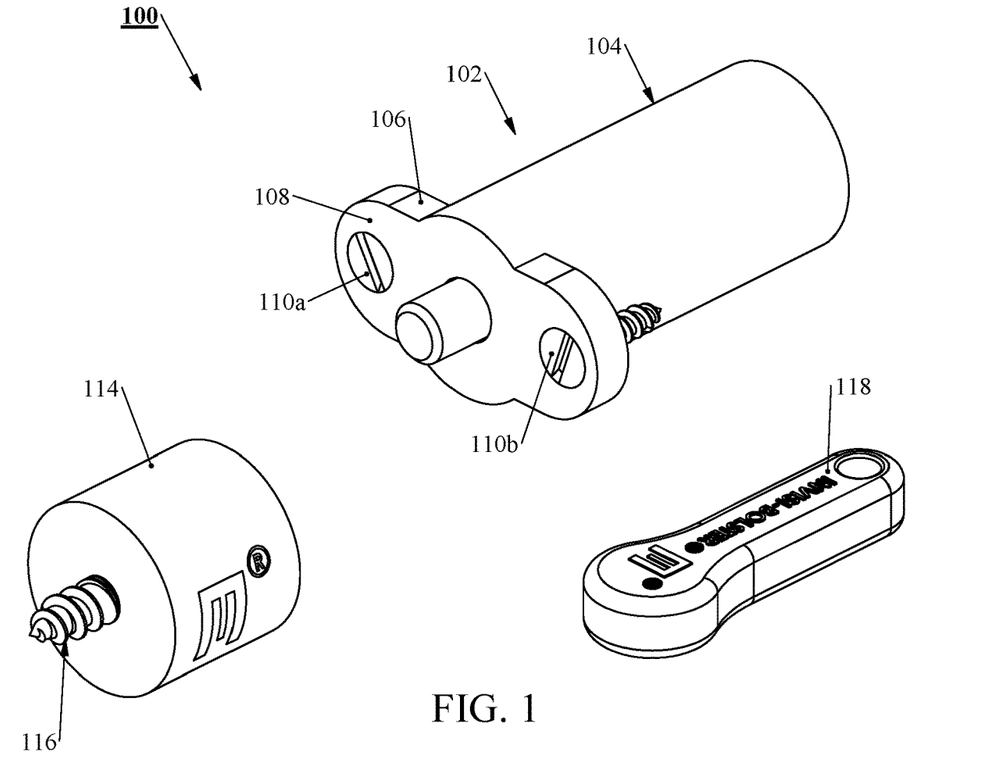
FIG. 1 is a diagram of a magnetic invisible shelf support device according to an embodiment of the present disclosure.

Turning to the figures, FIG. 1 is a diagram of components of system provided herein according to an embodiment of the present disclosure. A system 100 is provided comprising a magnetic casing 102. The magnetic casing 102, hereinafter casing 102, comprises a barrel 104 and a cover 106. The cover 106 has a face 108. There are two holes in the face 108 through which casing screws 110*a-b* are used to attach the casing 102 to an end panel of a shelf or other horizontal panel that is to be joined with a vertical panel, for example a bookshelf interior sidewall. The casing 102 also includes a pin 112 which is an aluminum or other metal rod that resides primarily inside the casing 102 when the horizontal panel is not connected to the vertical panel but protrudes forth when moved as described herein, causing the panels to be joined.

The system 100 also comprises an insert 114 which is placed fully into a hole bored into the vertical panel at the point where the horizontal panel is to join the vertical panel. The insert 114 has a hole in its end that is not visible in FIG. 1 into which the pin 112 protrudes deeply to firmly affix the casing 102 to the insert 114 and the shelf or horizontal panel to the bookshelf sidewall or vertical panel. An insert screw 116 is shown in FIG. 1 protruding from the bottom of the insert 114. While it appears that the insert screw 116 is part of the insert 114, in embodiments the insert screw 116 is a separate component from the insert 114 and is placed through the hole in the bottom of the insert 114 and then turned to tightly affix the insert 114 into the bookshelf sidewall.

The system 100 also comprises a magnetic hand tool 118 that contains a magnet in its wider end or head area and is used to slide along the surface of the horizontal panel at the location of the casing 102. The magnetic attraction of the hand tool 118 and the pin 112 allows the pin 112 to be moved toward or away from the insert 114, even though the casing 102 is almost entirely inside of the wood panel. The magnetic forces penetrate the wood and allow the pin 112 to be moved even though there is no direct physical contact between the tool 118 and the casing 102.

The casing 102 houses a ring magnet (not shown) inside the cover 106 near the pin 112. The ring magnet aligns with the metal insert 114 for a quick attachment of the horizontal shelf panel and vertical side wall of the subject item of furniture. The attraction between the ring magnet of the casing 102 and the insert 114 facilitates an intuitive and rapid positioning of the shelves before the tool 118 is used to attract the bolt 120 and slide it into the insert 114 on the side wall.

To secure casing 102 into an end panel of a horizontal shelf for placement, a hole is bored into the end panel. An electric drill with a Forstner drill bit may be used for this task.

The Forstner bit may be used to drill more shallow holes or indentations for placement of the areas of the cover 106 slightly to the right and left of the area of the pin 112. The cover 106 is wider than the barrel 104 which fits deeply into the hole drilled using the Forstner bit. The entire casing 102, which includes the barrel 104 and the cover 106, fits into the area drilled using the Forstner bit. The face 108, which is the outer surface of the cover 106, would be flush with the surface of the end panel of the shelf or horizontal panel when the casing 102 is fully installed into the horizontal panel with the casing screws 110*a-b* fully screwed into the horizontal panel.

Figure 2:
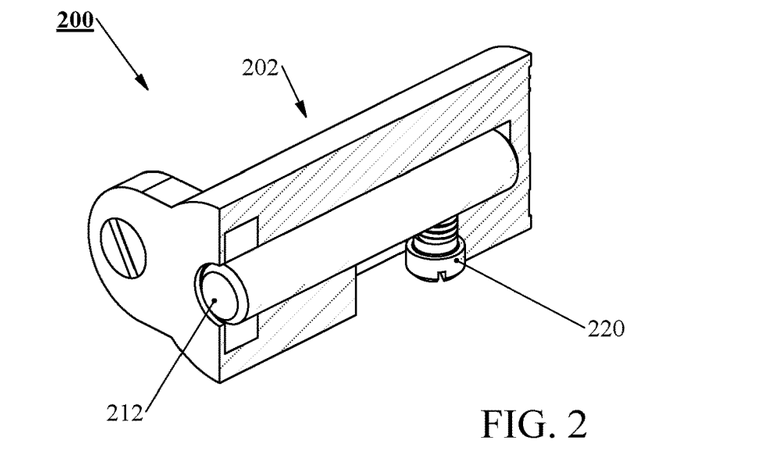
FIG. 2 is a diagram of a magnetic invisible shelf support device according to an embodiment of the present disclosure.

FIG. 2 is another diagram of components of the INVISI-BOLSTER™. A system 200 is provided wherein the components of the system 200 are indexed to the components of the system 100. Most components of the system 200 are not numerically labeled to reduce clutter in FIG. 2 and facilitate ease of examination of FIG. 2.

FIG. 2 depicts a bolt 220 that is attached to the pin 212 and protrudes from the pin 212 in a perpendicular manner. The bolt 220 may be made of steel or other substance that is attracted by the magnet of the tool 118. When a user moves the head area of the tool 118 proximate the bolt 220, the pin 212 moves in the direction of the movement of the tool 118.

Figure 3:
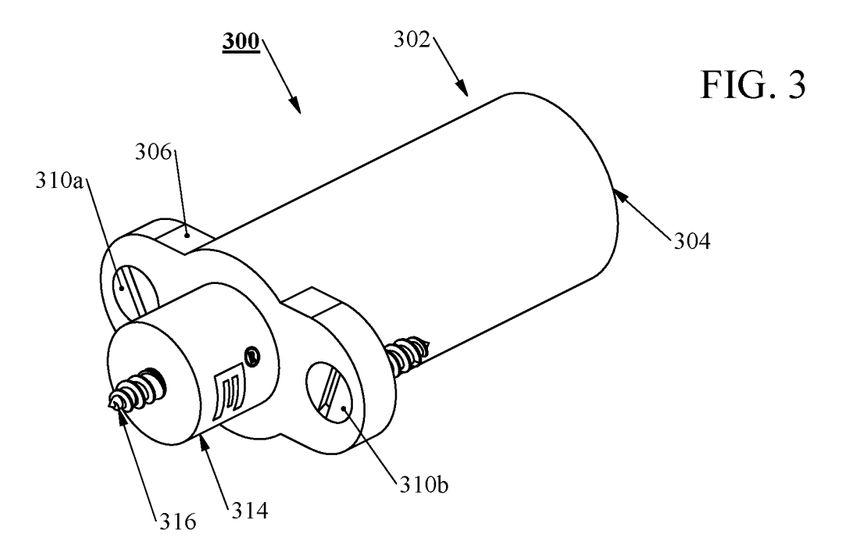
FIG. 3 is a diagram of a magnetic invisible shelf support device according to an embodiment of the present disclosure.

FIG. 3 is another diagram of components of the INVISI-BOLSTER™. A system 300 is provided wherein the components of the system 300 are indexed to the components of the system 100. Most components of the system 300 are not numerically labeled to reduce clutter in FIG. 3 and to facilitate ease of examination of FIG. 3.

FIG. 3 depicts how the casing 302 joins tightly with the insert 314. The casing 302 houses a ring magnet (not shown) inside the cover 306 near the pin 312 (not shown). The ring magnet aligns with the overlapping metal insert 314 for a quick attachment of the horizontal shelf panel and vertical side wall of the subject item of furniture. The attraction between the ring magnet of the casing 302 and the insert 314 facilitates an intuitive and rapid positioning of the shelves before the tool 118 is used to attract the bolt 320 on the pin 312 (neither component depicted in FIG. 3) and slide it into the insert 314 on the side wall.

Figure 4:
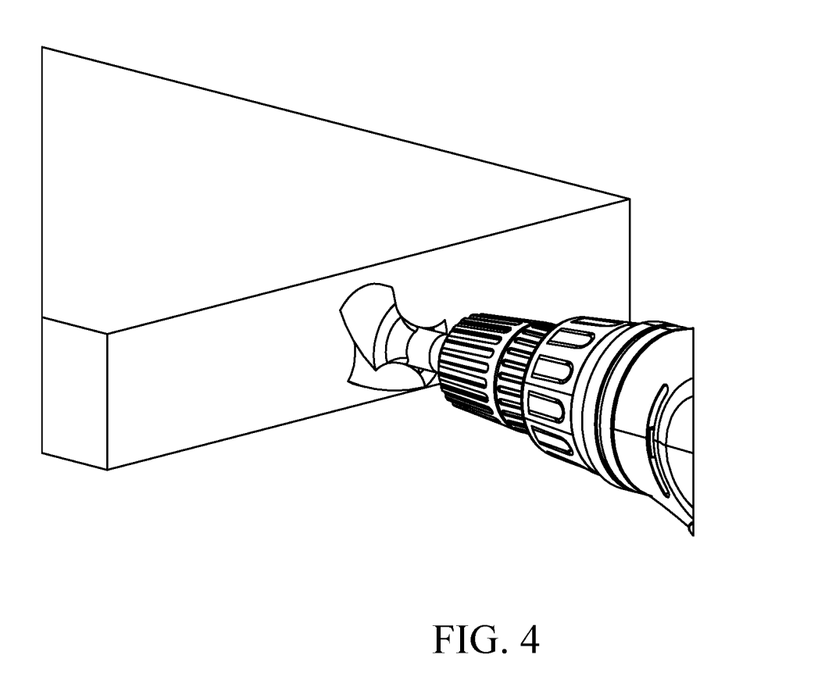
FIG. 4 is a diagram of a magnetic invisible shelf support device according to an embodiment of the present disclosure.

FIG. 4 depicts how a hole is drilled into an end panel of a horizontal shelf for placement of the casing 102. An electric drill with a Forstner drill bit may be used for this task. The Forstner bit is a well-known tool in the field of woodworking.

Figure 5:
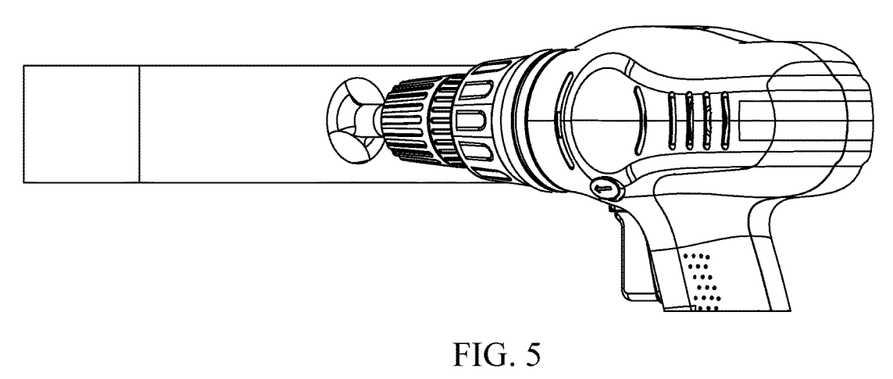
FIG. 5 is a diagram of a magnetic invisible shelf support device according to an embodiment of the present disclosure.
Figure 6:
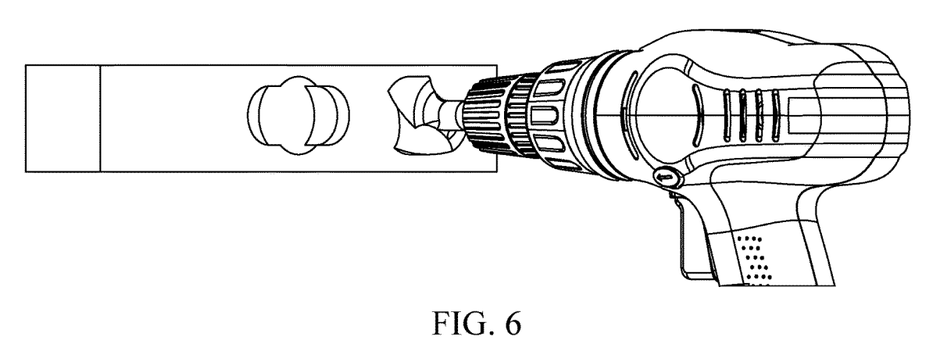
FIG. 6 is a diagram of a magnetic invisible shelf support device according to an embodiment of the present disclosure.

FIG. 5 and FIG. 6 depict how the same electric drill and Forstner bit may be used to drill more shallow holes or indentations for placement of the areas of the cover 106 slightly to the right and left of the area of the pin 112. As can be seen, the cover 106 is wider than the barrel 104 which fits deeply into the hole drilled in FIG. 4. The entire casing 102, which includes the barrel 104 and the cover 106, fit into the area drilled as shown in FIG. 4, FIG. 5, and FIG. 6. The face 108, which is the outer surface of the cover 106, would be flush with the surface of the end panel of the shelf or horizontal panel when the casing 102 is fully installed into the horizontal panel with the casing screws 110*a-b* fully screwed into the horizontal panel.

Figure 7:
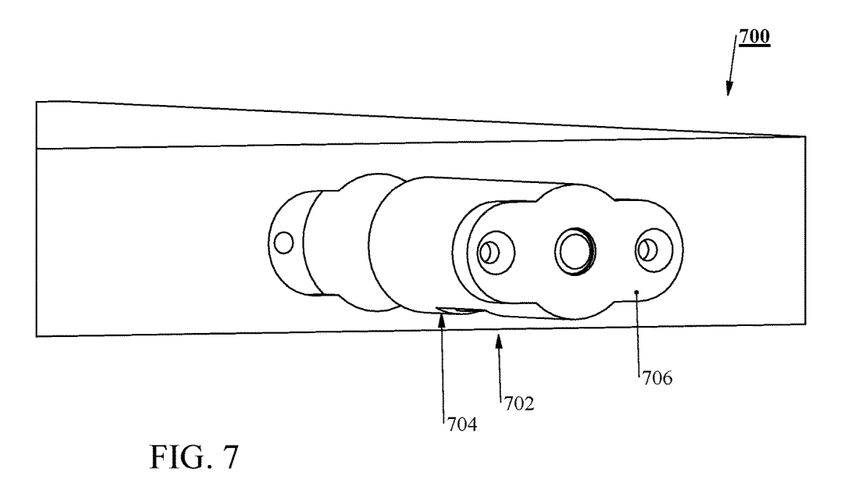
FIG. 7 is a diagram of a magnetic invisible shelf support device according to an embodiment of the present disclosure.

Components of a system 700 shown in FIG. 7 are indexed to the components of the system 100. FIG. 7 depicts the casing 702 before it is placed into the fully drilled deep hole for the barrel 704 and the shallower indentations for the cover 706.

Figure 8:
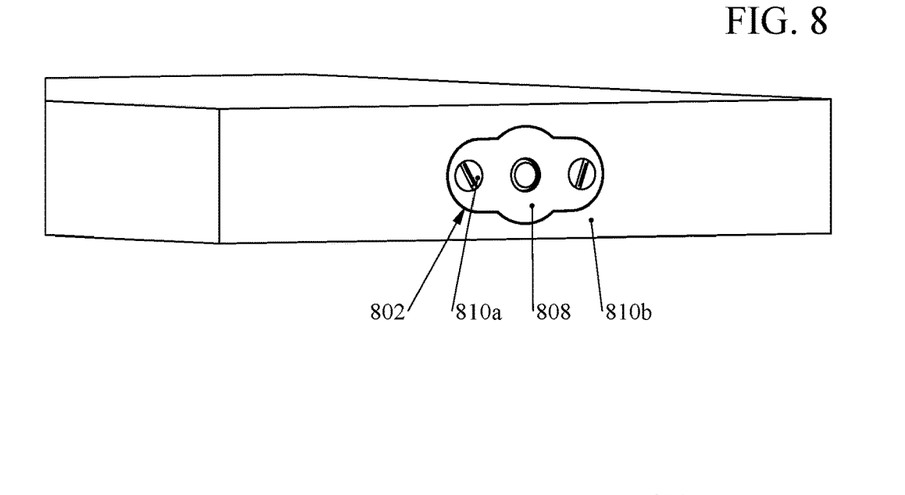
FIG. 8 is a diagram of a magnetic invisible shelf support device according to an embodiment of the present disclosure.

FIG. 8 is a diagram of the casing 802 fully installed into the end panel of a shelf. Casing screws 810*a-b* are shown as fully placed into the face 808 which is flush with the surface of the end panel.

Figure 9:
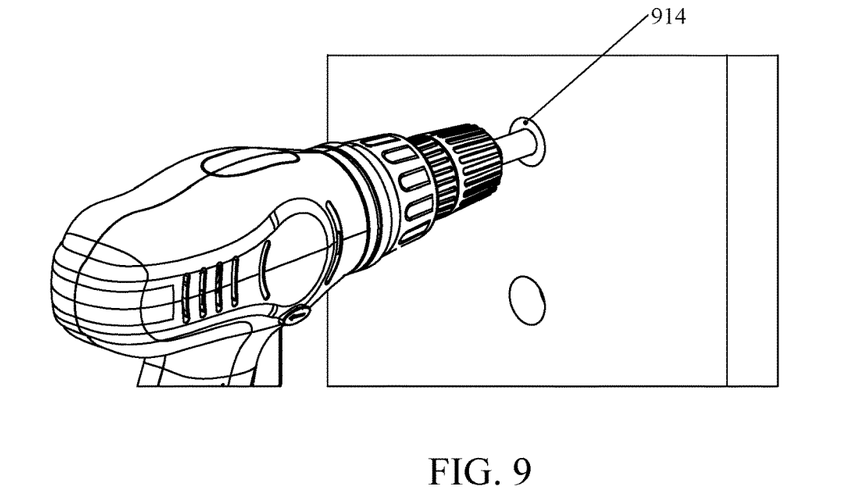
FIG. 9 is a diagram of a magnetic invisible shelf support device according to an embodiment of the present disclosure.
Figure 10:
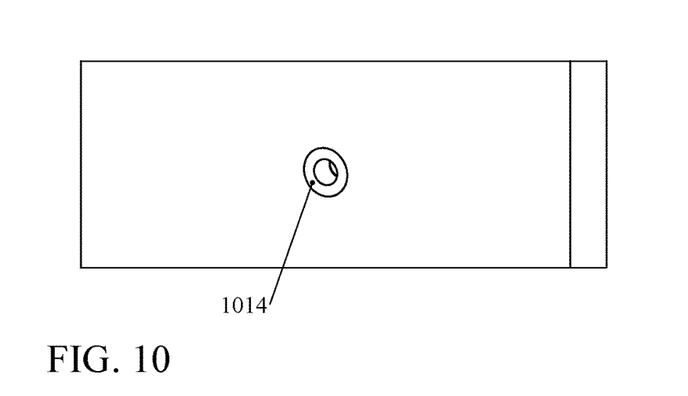
FIG. 10 is a diagram of a magnetic invisible shelf support device according to an embodiment of the present disclosure.

FIG. 9 depicts how a hole is drilled into a vertical panel for placement of the casing 914. An electric drill with Forstner drill bit may be used for this task. FIG. 10 depicts the casing 1014 fully installed into the vertical panel.

Figure 11:
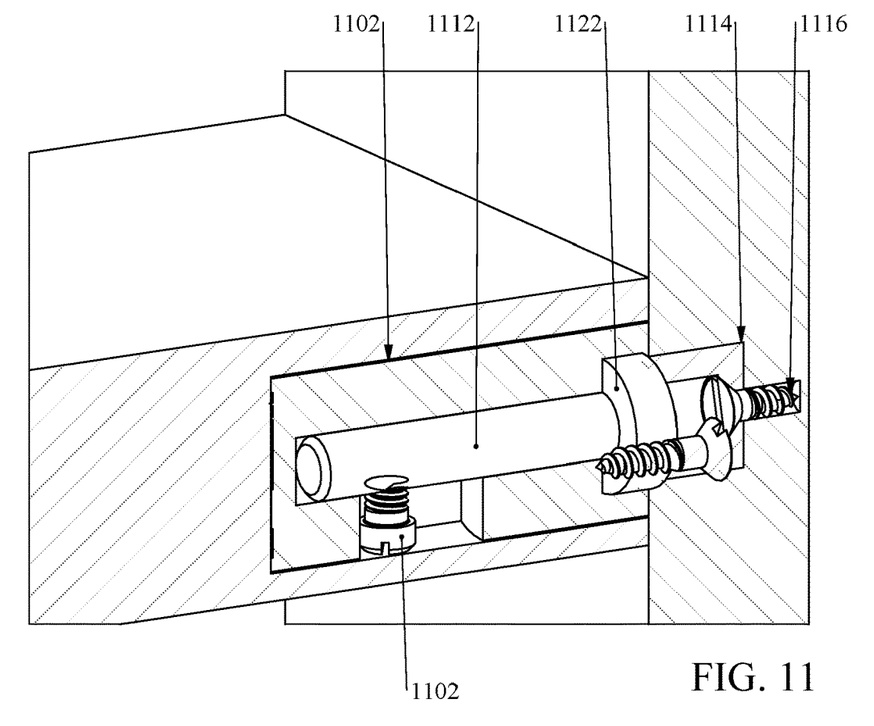
FIG. 11 is a diagram of a magnetic invisible shelf support device according to an embodiment of the present disclosure.

FIG. 11 is a diagram that depicts the casing 1102 and the insert 1114 inside of their respective panels and fully joined. The pin 1112 and the bolt 1120 are depicted as is the insert screw 1116. Also depicted is the ring magnet 1122 that is fully contained within the casing 1102 and has not been depicted in previous figures.

Figure 12:
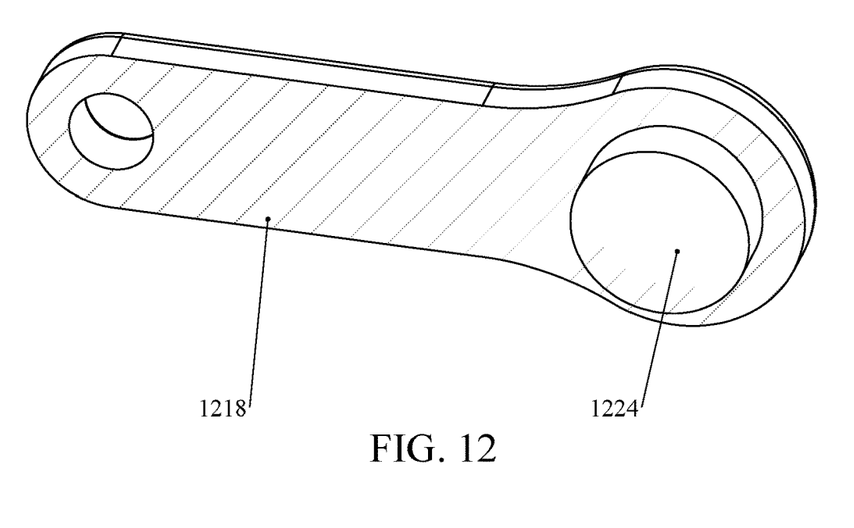
FIG. 12 is a diagram of a magnetic invisible shelf support device according to an embodiment of the present disclosure.

FIG. 12 is a diagram of the tool 1218 and the tool magnet 1224 in the head area of the tool 1218.

Figure 13:
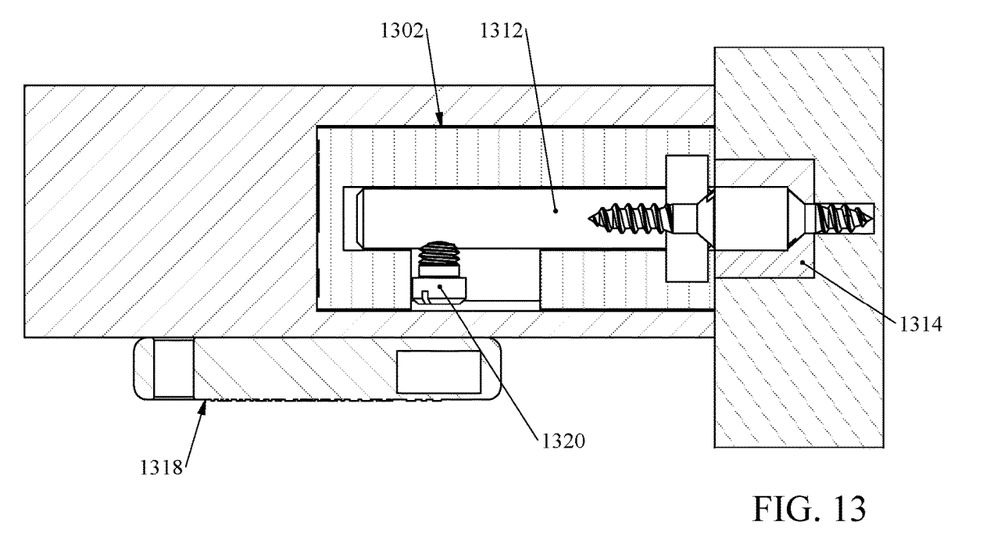
FIG. 13 is a diagram of a magnetic invisible shelf support device according to an embodiment of the present disclosure.

FIG. 13 is a diagram of all the components of the system 100 in operation including casing 1302, insert 1314, and tool 1318. Also enumerated are the pin 1312 and the bolt 1320. In FIG. 13, the pin 1312 is in its recessed position such that its head or end is not protruding into the insert 1314.

Figure 14:
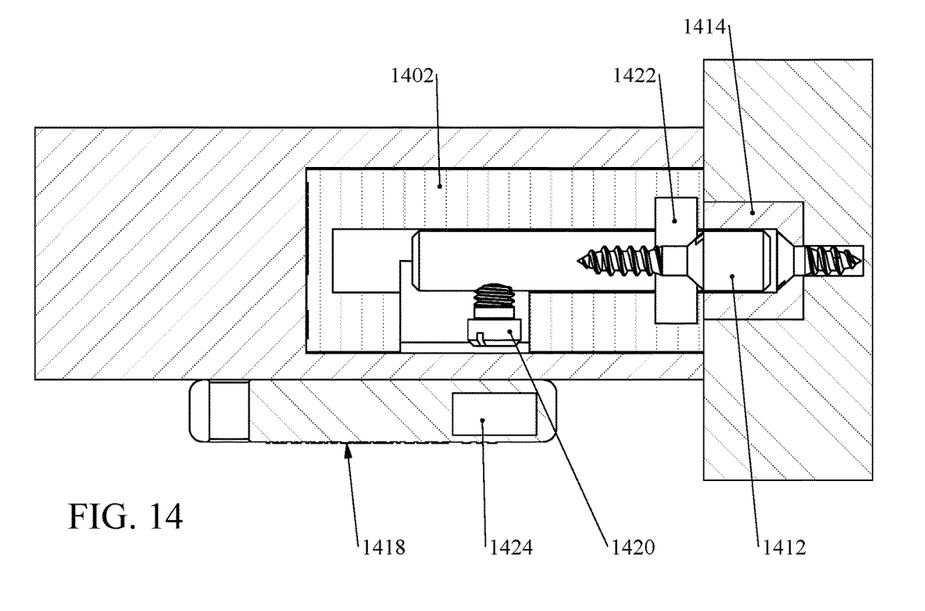
FIG. 14 is a diagram of a magnetic invisible shelf support device according to an embodiment of the present disclosure.

FIG. 14 is another diagram of all the components of the system 100 in operation including casing 1402, insert 1414, and tool 1418. Other components pointed out are the bolt 1420, the ring magnet 1422, and the tool magnet 1424. The pin 1412 is also shown. In contrast to FIG. 13, FIG. 14 depicts the pin 1412 in forward position and therefore fully protruding into the insert 1414.

Figure 15:
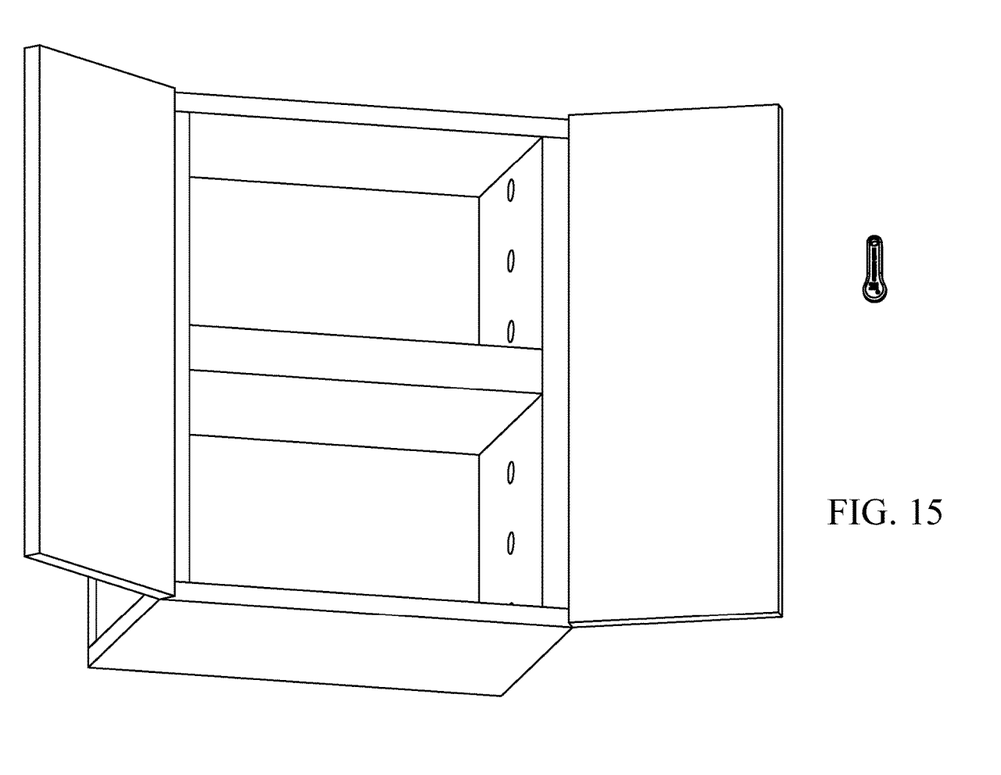
FIG. 15 is a diagram of a magnetic invisible shelf support device according to an embodiment of the present disclosure.

FIG. 15 is an image of a bookshelf, cupboard, or similar item of furniture with shelf showing installed inside that may be constructed using the teachings herein. No hardware or other devices are visible for supporting the shelf as the hardware is entirely inside the shelf and inside the vertical sidewall as described herein.

The INVISI-BOLSTER™ uses the non-contact concept of magnetic fields passing through wooden substrates. It provides a loading capacity of up to 176 lbs or 70 kgs per shelf and may fit cabinets with 0.25 in, 0.35 in and 0.375 in holes. The magnetic pull force ensures the tool 118 connects with the bolt 220 even though there is no direct contact between them. Magnetic pull force passes through substrates such as wood to allow engagement and movement. The shelves can be disengaged for repositioning by simply sliding the pin 112 back into the casing 102 via the tool 118.

The INVISI-BOLSTER™ requires no visible fixings, brackets, fittings, pegs, shelf support spoons, or other mechanical components, and enhances the aesthetics of the furniture. Cabinetry shelf panels can be fitted permanently or removed and re-used with ease. Magnetism does not interfere with installation or dismantling.

Regarding technical specifications of the system, the system has loading capacity of 70 kilograms or 176 lbs. Panel thickness is minimum one-half inch. Drilling diameter is 0.25 inch to 0.375 inch. Appearance is invisible and fully concealed. Material is stainless steel or engineering plastic.

Regarding applications of the system, applications comprise cabinet, furniture, cupboard, kitchen shelf support, and bookshelf. Applications also comprise wardrobe, bookcase, display cabinet, closet, and pantry shelving.

The system may replace shelf support pegs, shelf pins, locking shelf rest pin, shelf support spoons, and shelf support push-in stud pegs. The system may also replace shelf support L-shaped clips, self-locking shelf support pegs, shelf support brackets, plug-in shelf support, and Richelieu shelf supports.

The system may replace shelf support products provided by Italiana Ferramenta. Such products may include K Push Tech, Secret, PK2, Kerala, and Flipper. Such products may also comprise Secury, Pull-in corner back, Tris, Spring, and K Line. Further, such products provided by Italiana Ferramenta may include Kintai, Poker, Maori, Unico, and Shelf retainer.

In an embodiment, a system for binding horizontal and vertical panels is provided. The system comprises a casing comprising a barrel and a cover, the casing inserted into an end of a horizontal panel. The system also comprises a cylindrical metal insert embedded into a first surface of a vertical panel. The system also comprises a sliding metal pin inside the casing that receives attraction with a magnet placed on a second surface of the horizontal panel proximate the casing. The pin moves, based on the received attraction and after the end of the horizontal panel is placed against the vertical panel at a location of the insert, the movement of the pin based on movement of the magnet. The pin also protrudes partially, based on the movement through a first hole in the cover, into a second hole in the insert.

The horizontal panel is a shelf, and the vertical panel is a sidewall of one of a bookshelf and a cupboard. The partial protrusion of and semi-permanent placement of a head portion of the pin into the second hole in the insert promotes the horizontal panel to bind to the vertical panel.

Binding of the horizontal panel to the vertical panel promotes storage of items on the horizontal panel. The magnet makes no physical contact with the casing or with the pin contained within the casing.

The magnet makes contact solely with the second surface. The magnet causes the pin to move solely by magnetic force through the horizontal panel and into the insert.

In another embodiment, a system for binding panels while concealing binding hardware is provided. The system comprises a horizontal panel and a vertical panel with area designated for placement of an end surface of the horizontal panel. The system also comprises a hollow casing placed into the end surface, an end portion of the casing flush with the end surface. The system also comprises a metal insert embedded into the vertical panel at the designated area. The system also comprises a sliding metal pin resident inside the casing that moves, based on receipt of an external force, toward a first hole in the end portion of the casing. The pin also extends partially through the first hole and into a second hole in the insert, the end surface of the horizontal panel having been placed against the vertical panel at the designated area prior to commencement of movement of the pin. The pin also remains semi-permanently placed with a head portion of the pin resident in the insert, the semi-permanent placement promoting binding of the horizontal panel to the vertical panel.

The external force is provided by a magnet placed on an external surface of the horizontal panel proximate a location of the casing inside the horizontal panel, the placement of the magnet attracting the pin. Sliding of the magnet along the external surface causes the pin to slide within the casing toward an edge of the horizontal panel.

The magnet makes no physical contact with the casing or with the pin contained within the casing. The magnet makes contact solely with the second surface and causes the pin to move solely by magnetic force through the casing and partially into the insert.

The horizontal panel is a shelf, and the vertical panel is an interior sidewall of one of a bookshelf and a cupboard. The semi-permanent placement of the pin is terminated when the bookshelf or cabinet is disassembled, and panels are disconnected.

In yet another embodiment, a method for assembling furniture with assembly hardware concealed is provided. The method comprises a portable magnet positioned on surface of a horizontal panel magnetically attracting a metal pin, the pin situated inside a casing contained within the panel. The method also comprises the magnet, based on the attraction and based on movement of the magnet along the surface in a first direction, causing the pin to move toward an edge of the panel and toward a first hole in the casing at the surface. The method also comprises the magnet further causing the pin to protrude partially through the first hole and into a second hole of a metal insert embedded into a vertical panel, the protrusion promoting binding of the horizontal panel to the vertical panel.

The method further comprises the magnet making contact solely with the surface and causing the pin to move solely by magnetic force through the casing and partially into the insert. The method further comprises the magnet moving in a second direction, the second direction opposite the first direction, to cause the pin to withdraw from the second hole and to promote decoupling of the panels.

The horizontal panel is a shelf, and the vertical panel is a sidewall of one of a bookshelf and a cupboard. Actions of the magnet and the pin promote binding of the panels. Binding of the horizontal panel to the vertical panel promotes storage of items on the horizontal panel. The metal insert is embedded into the vertical panel such that an outer surface of the insert is flush with a surface of the vertical panel.

What is claimed is:

1. A system for binding horizontal and vertical panels, comprising:
   a casing comprising a barrel and a cover, the casing inserted into an end of a horizontal panel;
   a cylindrical metal insert embedded into a first surface of a vertical panel;
   a sliding metal pin inside the casing that:
      receives attraction with a magnet placed on a second surface of the horizontal panel proximate the casing,
      moves, based on the received attraction and after the end of the horizontal panel is placed against the vertical panel at a location of the insert, the movement of the pin based on movement of the magnet, and
      protrudes partially, based on the movement through a first hole in the cover, into a second hole in the insert.

2. The system of claim 1, wherein the horizontal panel is a shelf, and the vertical panel is a sidewall of one of a bookshelf and a cupboard.

3. The system of claim 1, wherein the partial protrusion of and a semi-permanent placement of a head portion of the pin into the second hole in the insert promotes the horizontal panel to bind to the vertical panel.

4. The system of claim 3, wherein binding of the horizontal panel to the vertical panel promotes storage of items on the horizontal panel.

5. The system of claim 1, wherein the magnet makes no physical contact with the casing or the pin contained within the casing.

6. The system of claim 1, wherein the magnet makes contact solely with the second surface.

7. The system of claim 1, wherein the magnet causes the pin to move solely by magnetic force through the horizontal panel and into the insert.

8. A system for binding panels while concealing binding hardware, comprising:
   a horizontal panel;
   a vertical panel with area designated for placement of an end surface of the horizontal panel;
   a hollow casing placed into the end surface, an end portion of the casing flush with the end surface;
   a metal insert embedded into the vertical panel at the designated area; and
   a sliding metal pin resident inside the casing that:
      moves, based on receipt of an external force, toward a first hole in the end portion of the casing,
      extends partially through the first hole and into a second hole in the insert, the end surface of the horizontal panel having been placed against the vertical panel at the designated area prior to commencement of movement of the pin, and
      remains semi-permanently placed with a head portion of the pin resident in the insert, the semi-permanent placement promoting binding of the horizontal panel to the vertical panel.

9. The system of claim 8, wherein the external force is provided by a magnet placed on an external surface of the horizontal panel proximate a location of the casing inside the horizontal panel, the placement of the magnet attracting the pin.

10. The system of claim 9, wherein sliding of the magnet along the external surface causes the pin to slide within the casing toward an edge of the horizontal panel.

11. The system of claim 9, wherein the magnet makes no physical contact with the casing or with the pin contained within the casing.

12. The system of claim 9, wherein the magnet makes contact solely with the second surface and causes the pin to move solely by magnetic force through the casing and partially into the insert.

13. The system of claim 8, wherein the horizontal panel is a shelf, and the vertical panel is an interior sidewall of one of a bookshelf and a cupboard.

14. The system of claim 8, wherein the semi-permanent placement of the pin is terminated when the bookshelf or cabinet is disassembled, and panels are disconnected.

* * * * *